Patented Sept. 17, 1929

1,728,205

UNITED STATES PATENT OFFICE

RUDOLF HAUSCHKA, OF COLOGNE-WESTHOVEN, GERMANY, ASSIGNOR TO GRACIA RICARDO, OF DORNACH, SWITZERLAND

METHOD FOR MANUFACTURING LANOLINLIKE COMPOSITIONS

No Drawing.   Application filed September 24, 1925.   Serial No. 58,257.

Natural lanolin for commercial purposes is ordinarily extracted from sheep wool.

The present invention relates to an artificial lanolin which has been found to possess the properties of natural lanolin and have certain advantages such as cheapness of cost and freedom from the obnoxious odor of the natural lanolin. It is produced from vegetable raw materials, absorbs its own weight of water or other liquid medical solutions, has high curative value, particularly for chapped skin, eczema and any sensitive membrane, may be preserved indefinitely, has a refreshing natural odor and may be used for pharmaceutical purposes other than those noted above, cosmetics, soaps, and lubricants in the textile industry.

In general, the product is produced by the treatment of natural esters, such as waxes, resins, fats and fatty oils, with compounds formed by the oxidation of alcohols under elimination of two atoms of hydrogen. These compounds may be aldehydes such as formaldehyde, and paraformaldehyde or aldehyde giving substances such as hexamethylene tetramine and ketones. Examples of different waxes are beeswax and ozokerite, while the resins may be coniferine resins or related resins. Castor oil is an example of a suitable fat or fatty oil while acetone is a suitable ketone for such use.

This treatment takes place in the presence of a metallic catalyst which is in the form of finely divided particles of certain heavy metals or oxides thereof such as nickel or iron oxide. The chemical reaction, condensation and polymerization, takes place in the presence of heat and is preferably carried on in a closed vessel so that a self-imposed gas or vapor pressure will be produced within the vessel. While the reaction is taking place, the mass is suitably agitated, as by stirring. Although the reaction is preferably carried on in a closed vessel, it may take place in an open receptacle. The mixture of the components may be diluted prior to heating, by an oleaginous hydrocarbon such as vaseline or vaseline oil and the resulting compound is finally treated to remove any deleterious residue, as by washing with pure hot water.

As one example of the above method, there may be used one part by weight of castor oil, one part by weight of beeswax, and two parts by weight of liquid petrolatum or petroleum jelly. The parts are mixed and heated with constant stirring in the presence of a catalyst such as finely divided particles of nickel with one-half part of formaldehyde (30% commercial solution in water) until, at about 90 degrees centigrade, the reaction begins with violent foaming. The stirring is continued until the reaction, or foaming, is completed, which will ordinarily be within one and one-half to two hours. The mixture is then allowed to stand until watery and oily layers separate, the watery layer then being removed from the oily layer, and the latter thoroughly washed in pure hot water. The oily layer is then strained through a filter and permitted to cool and harden into a viscous mass resembling petroleum jelly. The slimy residue in the filter contains substantially the full amount of the metal or metallic oxide used as catalyst. It has been found to have a capacity to absorb twice its weight of water or any medical compound utilizing water as a carrier or solvent. The petroleum jelly or other oleaginous material is used merely as a diluting means and may be omitted without impairing the compound.

Paraformaldehyde or other aldehyde-giving substances of like properties, such as hexamethylene tetramine may be used in place of the formaldehyde as recited above.

Another example of a suitable combination is one part pine rosin, one part by weight of Japan wax and three parts by weight of liquid petrolatum or petroleum jelly treated with one-half part acetaldehyde and one-quarter part acetone in the presence of several drams of finely divided iron or divided iron oxide. Either the iron or iron oxide will suffice as a catalyst. The mixture of these ingredients is heated in the manner above described and the subsequent steps are also similar.

The product thus obtained is most readily emulsifiable with water or aqueous preparations at any ratio up to twice its own weight of water, or any medical compound utilizing water as a carrier or solvent. It also shows the so-called "cholesterine" reaction required in respect of the use of natural lanolin for pharmaceutical preparations. This composition has the advantage over the natural lanolin, of being cheaper to manufacture and free from the disagreeable odor of the latter.

The consistency or viscosity of the final product can be changed by varying the amount of the diluting means (oleaginous hydrocarbon material) as desired. In some cases it may be desirable to dispense with this substance, thus obtaining a stiffer or harder product. The diluting or softening medium may also be added after heating and even after purifying.

The natural esters need not necessarily be used in a chemically pure state, it being sufficient, for instance, to employ commercially pure resin which besides esters also contains a considerable percentage of resinic acids.

What I claim is:

1. The process of making a lanolin-like composition comprising heating a quantity of a natural ester with a compound formed by the oxidation of an alcohol under the elimination of two atoms of hydrogen and a metallic catalyst, separating the resulting layer of oil formed and cooling the oil to form a viscous mass.

2. The process of making a lanolin-like composition comprising heating a quantity of a natural ester with a compound formed by the oxidation of an alcohol under the elimination of two atoms of hydrogen and a metallic catalyst, stirring the mixture until the reaction is concluded, separating the resulting layer of oil formed and cooling the oil to form a viscous mass.

3. The process of making a lanolin-like composition comprising heating under a pressure a quantity of a natural ester with a compound formed by the oxidation of an alcohol under the elimination of two atoms of hydrogen and a metallic catalyst, separating the resulting layer of oil formed and cooling the oil to form a viscous mass.

4. The process of making a lanolin-like composition comprising heating a quantity of a natural ester with a quantity of formaldehyde in the presence of a metallic catalyst, separating the resulting layer of oil formed and cooling the oil to form a viscous mass.

5. The process of making a lanolin-like composition comprising heating until reaction begins, one part by weight of castor oil, one part by weight of beeswax and two parts by weight of petroleum with one half part of 30 percent commercial solution of formaldehyde in the presence of finely divided particles of nickel, stirring until reaction is completed, allowing the mixture to settle and form watery and oily layers, removing the oily layer, washing the oily layer with pure hot water, filtering, and permitting the filtrate to cool.

This specification signed this 28th day of August, A. D. 1925.

RUDOLF HAUSCHKA.